United States Patent
Tsai et al.

(10) Patent No.: US 8,502,833 B2
(45) Date of Patent: Aug. 6, 2013

(54) ELECTRONIC APPARATUS WITH MULTIPLE SCREENS AND IMAGE DISPLAYING METHOD THEREOF

(75) Inventors: Chuan-Ming Tsai, Taipei Hsien (TW); Tzu-Lung Chuang, Taipei Hsien (TW); Chueh-Pin Ko, Taipei Hsien (TW)

(73) Assignee: Acer Incorporated, New Taipei (TW)

( * ) Notice: Subject to any disclaimer, the term of this patent is extended or adjusted under 35 U.S.C. 154(b) by 505 days.

(21) Appl. No.: 12/822,195

(22) Filed: Jun. 24, 2010

(65) Prior Publication Data

US 2011/0157203 A1 Jun. 30, 2011

(30) Foreign Application Priority Data

Dec. 31, 2009 (TW) .............................. 98146360 A

(51) Int. Cl.
| | |
|---|---|
| *G09G 5/00* | (2006.01) |
| *G06F 3/14* | (2006.01) |
| *G06F 3/00* | (2006.01) |
| *G06F 3/048* | (2006.01) |
| *G06F 7/00* | (2006.01) |

(52) U.S. Cl.
USPC ........... 345/581; 345/619; 345/629; 345/156; 345/1.1; 348/840; 715/700; 715/764; 715/810; 707/705

(58) Field of Classification Search
USPC ................ 345/418, 581, 619–620, 624–626, 345/629–630, 156, 160, 168, 547–548, 555, 345/204, 1.1, 4–5, 902, 960; 348/563–565, 348/739, 778, 840; 715/200–203, 700, 733, 715/764–765, 810, 835, 856; 707/705; 711/100
See application file for complete search history.

(56) References Cited

U.S. PATENT DOCUMENTS

| 6,801,918 B1 * | 10/2004 | Mizuno .................................. 1/1 |
| 7,176,848 B1 | 2/2007 | Dai et al. |
| RE39,652 E * | 5/2007 | Oashi et al. .................... 715/209 |
| 8,270,815 B2 * | 9/2012 | Yen et al. ....................... 386/278 |
| 2003/0115598 A1 * | 6/2003 | Pantoja .......................... 725/40 |

(Continued)

FOREIGN PATENT DOCUMENTS

| FR | 2928257 | 9/2009 |
| TW | 200849066 | 12/2008 |

OTHER PUBLICATIONS

"Partial Search Report of European Counterpart Application", issued on May 19, 2011, p. 1-p. 6, in which the listed references were cited.

(Continued)

*Primary Examiner* — Wesner Sajous
(74) *Attorney, Agent, or Firm* — Jianq Chyun IP Office

(57) ABSTRACT

An electronic apparatus with multiple screens and an image displaying method thereof are provided. The image displaying method is adapted to an electronic apparatus. The electronic apparatus includes a first display unit and a second display unit. The image displaying method includes following steps. By a processing module, a digital file is read, and a content of the digital file is displayed on the first display unit. Whether the content of the digital file includes at least one dynamic image is detected by the processing module. When the content of the digital file includes the at least one dynamic image, the at least one dynamic image is displayed on the second display unit by the processing module.

16 Claims, 7 Drawing Sheets

U.S. PATENT DOCUMENTS

| | | | |
|---|---|---|---|
| 2004/0194027 A1* | 9/2004 | Suzuki et al. | 715/515 |
| 2004/0203942 A1* | 10/2004 | Dehlin | 455/466 |
| 2007/0121012 A1 | 5/2007 | Hida et al. | |
| 2008/0068675 A1* | 3/2008 | Sakuda | 358/474 |
| 2008/0150920 A1 | 6/2008 | Yen | |
| 2010/0048288 A1* | 2/2010 | Canterbury et al. | 463/20 |
| 2010/0241507 A1* | 9/2010 | Quinn et al. | 705/14.42 |
| 2011/0010380 A1* | 1/2011 | Chen | 707/769 |

OTHER PUBLICATIONS

"The extended European search report of European counterpart application", issued on Oct. 4, 2011, p. 1-p. 11, in which the listed references were cited.

"Office Action of Taiwan Counterpart Application", issued on Jan. 14, 2013, p. 1-p. 6, in which the listed reference was cited.

* cited by examiner

ELECTRONIC APPARATUS WITH MULTIPLE SCREENS AND IMAGE DISPLAYING METHOD THEREOF

CROSS-REFERENCE TO RELATED APPLICATION

This application claims the priority benefit of Taiwan application serial no. 098146360, filed on Dec. 31, 2009. The entirety of the above-mentioned patent application is hereby incorporated by reference herein and made a part of this specification.

BACKGROUND OF THE INVENTION

1. Field of the Invention

The invention relates to an electronic apparatus and an image displaying method thereof, and particularly to an electronic apparatus with multiple screens and an image displaying method thereof.

2. Description of Related Art

With a rapid progress in science and technology, e-reader has become widely adopted by the general public. More and more users start reading digital electronic files with an e-reader instead of reading conventional physical books. Users can also use a network connecting module of the e-reader to connect to the network, so as to download files or open desirable web pages for browsing the contents thereof.

However, in consideration of energy saving, the e-reader usually uses a high resolution low frequency (HRLF) display to replace the conventional low frequency high resolution (LRHF) display.

Currently, most web pages of the websites accessible from the network have rich contents and frequently have animations or dynamic images embedded in the contents thereof. The animations and dynamic images help users browsing the web pages to more quickly understand the contents of the web pages. However, when the conventional e-reader is linked to the web pages having animations or dynamic images, because the display of the e-reader usually fails to provide a sufficient frame per second (FPS) rate, the problem of frame delay occurs when the contents of the animations and motion images are displayed on the display of the e-reader. This is of course very inconvenient to the users who read with an e-reader.

SUMMARY OF THE INVENTION

Accordingly, an exemplary embodiment of the invention provides an electronic apparatus with multiple screens and an image displaying method thereof, so as to solve the problem of frame delay occurring in contents displayed on displays.

Furthermore, another exemplary embodiment of the invention provides an electronic apparatus with multiple screens and an image displaying method thereof, such that users can selectively display the contents of the digital files in different windows of the electronic apparatus.

An exemplary embodiment of the invention provides an image displaying method adapted to an electronic apparatus. The electronic apparatus includes a first display unit and a second display unit. The image displaying method includes following steps. By a processing module, a digital file is read, and a content of the digital file is displayed on the first display unit. Whether the content of the digital file includes at least one dynamic image is detected by the processing module. When the content of the digital file comprises the at least one dynamic image, the at least one dynamic image is displayed on the second display unit by the processing module.

Another exemplary embodiment of the invention provides an electronic apparatus with multiple screens including a first display unit, a second display unit, and a processing module. The processing module is electrically connected to the first display unit and the second display unit, reads a digital file to display a content of the digital file on the first display unit, and detects whether the content of the digital file includes at least one dynamic image. When the content of the digital file includes the at least one dynamic image, the processing module controls the second display unit to display the at least one dynamic image.

Another exemplary embodiment of the invention provides an image displaying method adapted to an electronic apparatus. The electronic apparatus includes a first display unit and a second display unit. The image displaying method includes following steps. By a processing module, a digital file is read, and a content of the digital file is displayed on the first display unit. At least one area on the first display unit is determined in response to a user's selection by an area selecting module. A display content of the at least one area is displayed on the second display unit by the processing module.

Another exemplary embodiment of the invention provides an electronic apparatus with multiple screens including a first display unit, a second display unit, a processing module, and an area selecting module. The processing module is electrically connected to the first display unit and the second display unit and reads a digital file to display a content of the digital file on the first display unit. The area selecting module is electrically connected to the processing module and determines at least one area on the first display unit in response to a user's selection, such that the processing module displays a display content of the at least one area on the second display unit.

Based on the above, in exemplary embodiments of the invention, the electronic apparatus with multiple screens and the image displaying method thereof have one or more of following advantages:

By automatically detecting whether the content of the digital file includes dynamic images, the electronic apparatus with multiple screens and the image displaying method thereof can selectively display different contents of digital files on the different display units so as to solve the problem of frame delay occurred in the contents displayed on the displays.

By selecting different areas through the area selecting module, the electronic apparatus with multiple screens and the image displaying method thereof can selectively play the display content of the area on the different display units so as to increase the convenience of the usage.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
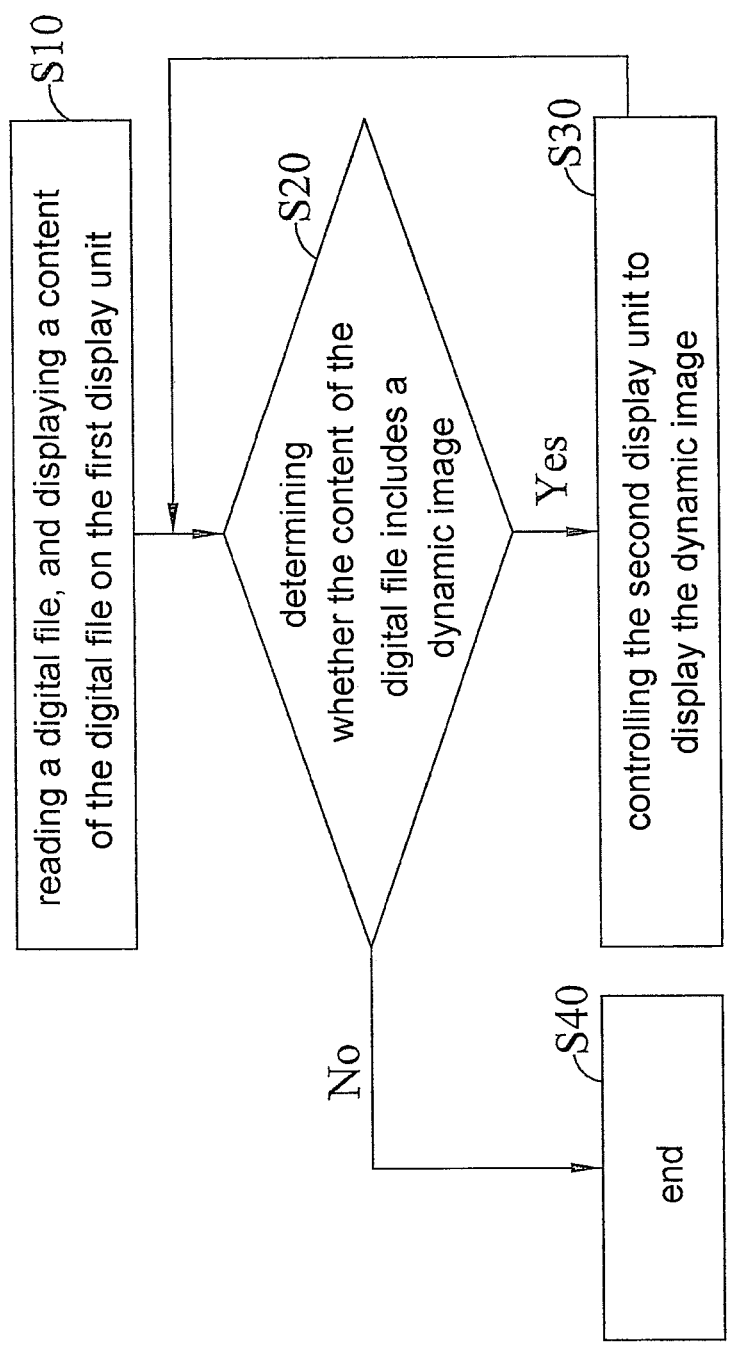
FIG. 1 is a flowchart of an image displaying method according to a first embodiment of the invention.

FIG. 1 is a flowchart of an image displaying method according to a first embodiment of the invention. Referring to FIG. 1, the image displaying method is adapted to an electronic apparatus including a first display unit and a second display unit. The image displaying method includes following steps.

In step S10, by a processing module, a digital file is read, and the content of the digital file is displayed on the first display unit. The first display unit, for example, is a low refresh rate display, such as a cholesteric liquid crystal display (CLCD), an E-paper display, or an E-ink display. The low refresh rate display has a FPS rate (frame per second rate) lower than 5 FPS. These types of displays are characterized by high resolution and low frequency and are usually bi-stable displays showing only black and white colors. In a bi-stable display, there are included millions of fine particles, which are divided into positive particles and negative particles. When a positive or a negative voltage is applied to these particles, the positive or the negative particles are affected by a produced electric field to move, so that the bi-stable display shows the color of the positive or the negative particles. With this type of color display mechanism, particles of different colors require more time to move in the process of moving, which results in a relatively low color frame rate. However, since each pixel on the display can have a plurality of fine particles, the bi-stable display has a resolution higher than that of general LCDs. In step S20, whether the content of the digital file includes dynamic images is detected by the processing module. If so, the flow proceeds to step S30. If not, the flow proceeds to step S40. Because FPS of the dynamic image is usually higher than that of the first display unit, if the dynamic image is displayed on the first display unit, the problem of frame delay may occur. Accordingly, whether the content of the digital file includes dynamic images is detected by the processing module. The format of the dynamic images may be vector graphics file format, such as Flash file format, or GIF file format that has multiple frames, or other suitable dynamic image formats.

In step S30, by the processing module, the second display unit is controlled to display the dynamic image. Next, the flow returns to step S20. The second display unit, for example, is a high refresh rate LCD. The LCD can be characterized by low resolution and high frequency, and the second display unit, for example, has a FPS rate ranged between 5 FPS and 30 FPS. The second display unit with higher FPS rate can display the dynamic image detected in the step S20 to thereby overcome the problem of frame delay as would occur when the dynamic image is displayed on the first display unit having a lower FPS rate.

In step S40, the flow is ended.

Furthermore, after step S40, the processing module can further extract a static image from a storage module and covers a display position of the dynamic image on the first display unit with the static image, so that the static image substitutes for the dynamic image that is originally to be displayed on the first display unit. Accordingly, the problem of low FPS rate of the first display unit is overcome. The static image, for example, is a graphic tileset having one single color. In the first embodiment, the image display method further includes a step of providing a network connecting module for connecting to a predetermined website, so that the processing module can read the digital file from the predetermined website.

Figure 2:
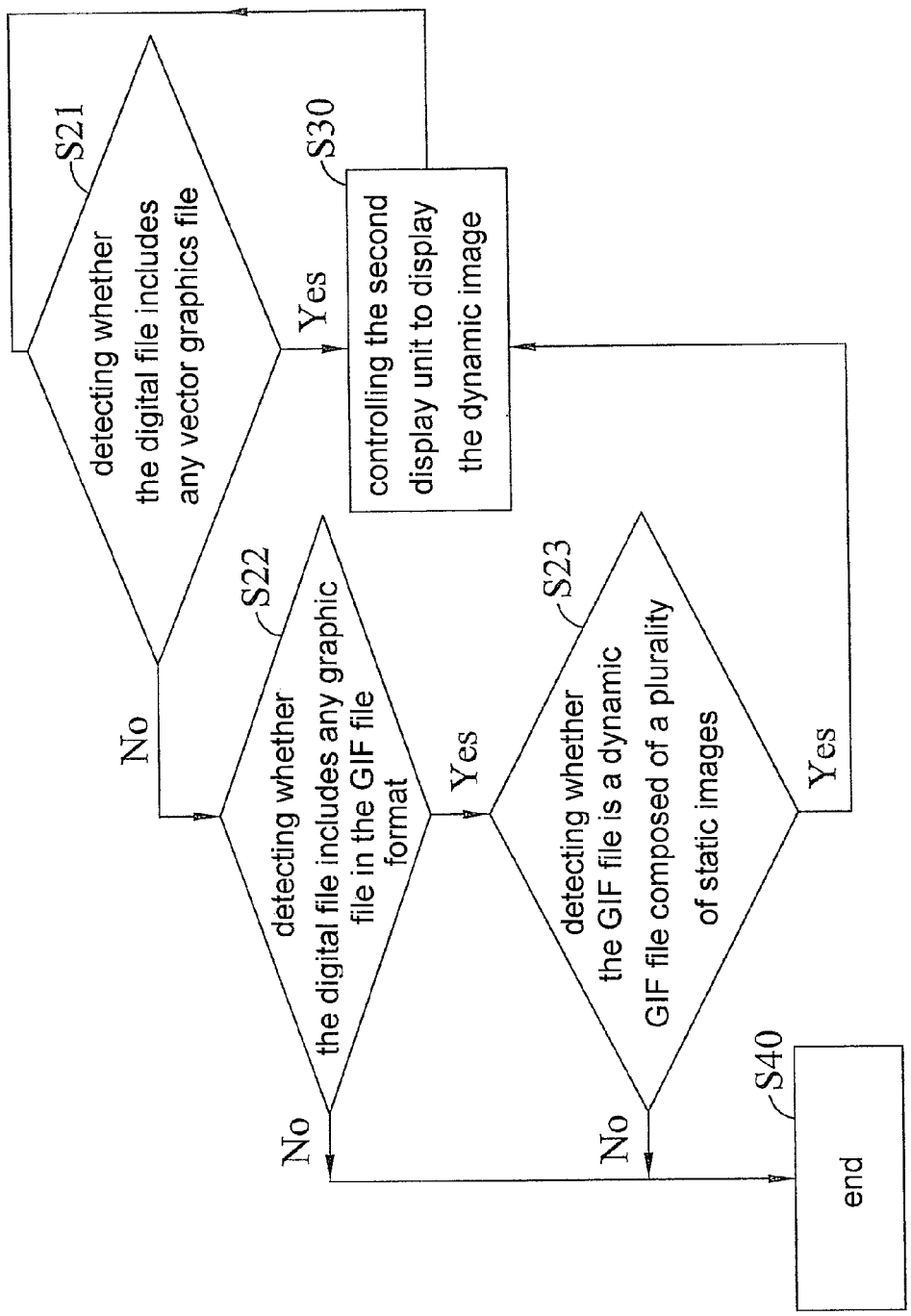
FIG. 2 is a flowchart showing detailed steps for determining the content of the digital file in step S20 of FIG. 1.

FIG. 2 is a flowchart showing detailed steps for determining the content of the digital file in step S20 of FIG. 1.

In step S21, whether the content of the digital file includes any vector graphics file is detected. If so, the flow proceeds to step S30. If not, the flow proceeds to step S22.

In step S22, whether the content of the digital file includes any graphic file in the GIF file format is detected. If so, the flow proceeds to step S23. If not, the flow proceeds to step S40.

In step S23, whether the GIF file is a dynamic GIF file composed of a plurality of static images is detected. If so, the flow proceeds to step S30. If not, the flow proceeds to step S40.

Figure 3A:
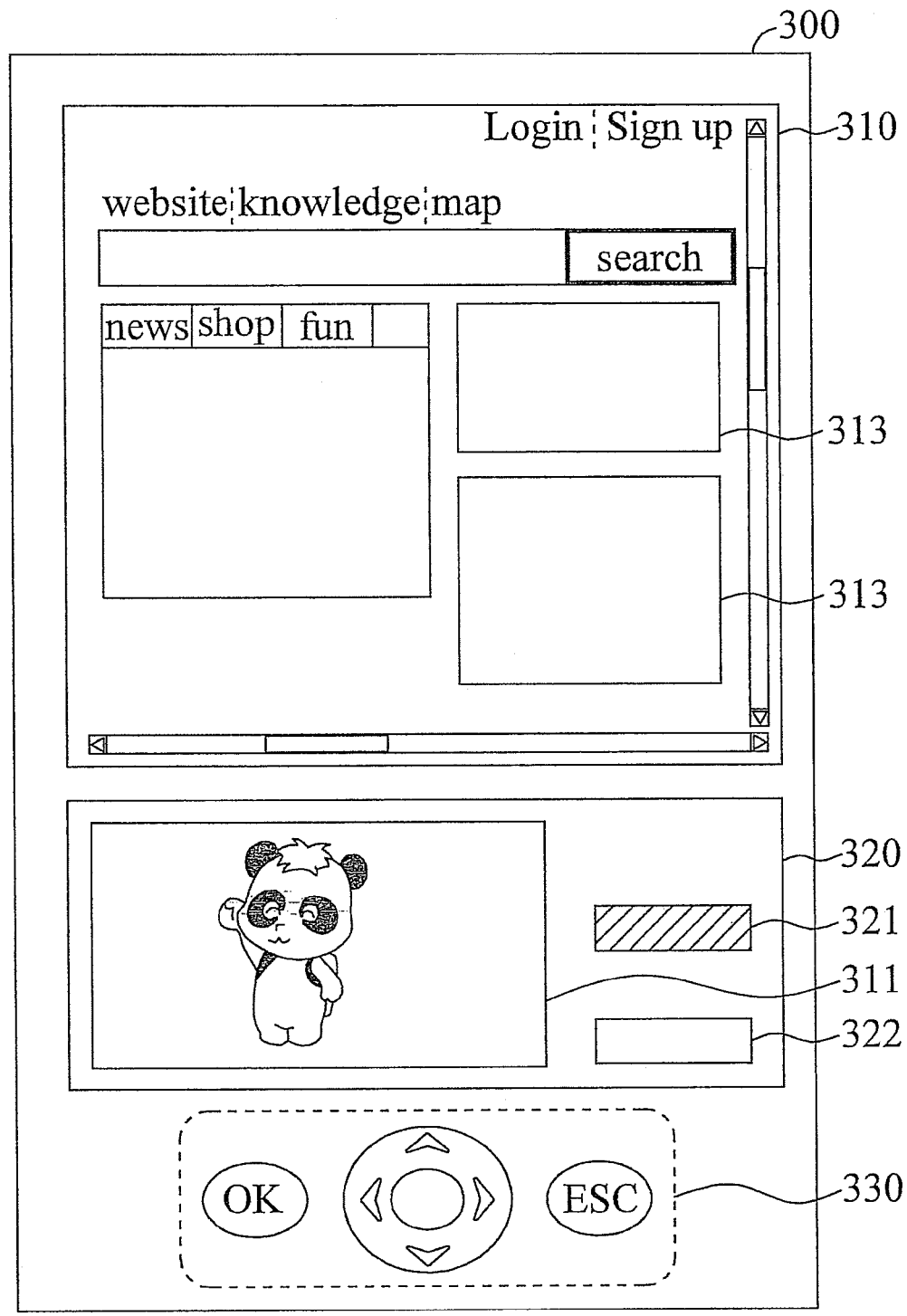
FIG. 3A is a schematic front view of an electronic apparatus to which the image displaying method is adapted according to an embodiment of the invention.
Figure 3B:
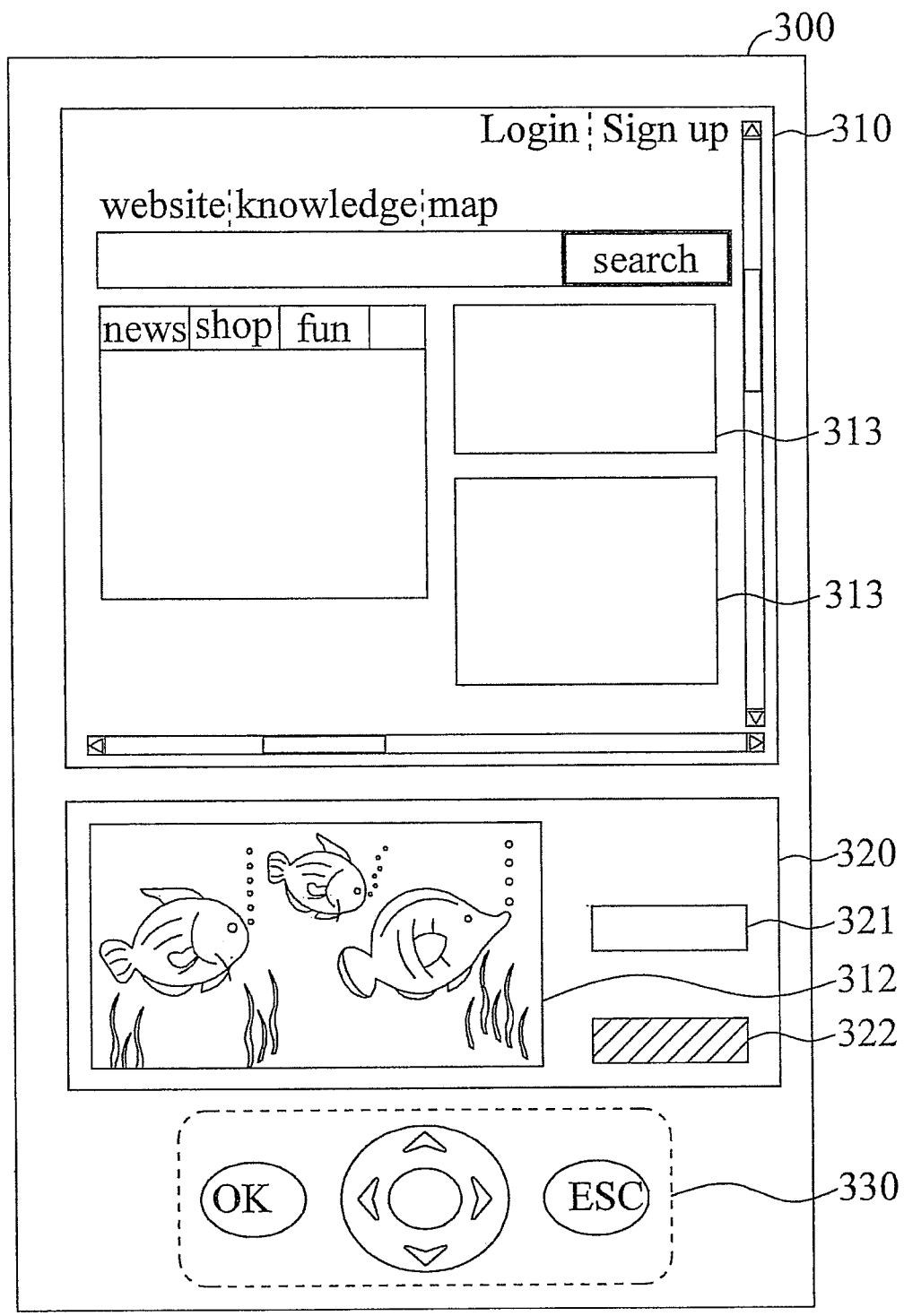
FIG. 3B is a schematic front view of an electronic apparatus to which the image displaying method is adapted according to another embodiment of the invention.

In the first embodiment, when the digital file includes a plurality of dynamic images, the second display unit can further display a plurality of options corresponding to each of the dynamic images. Users can select any desired options by a pointer selecting unit, so that dynamic images corresponding to the selected options are displayed on the second display unit, as shown in FIGS. 3A and 3B. In FIG. 3A and FIG. 3B, the electronic apparatus 300 includes a first display unit 310, a second display unit 320, and a pointer selecting unit 330. The pointer selecting unit 330, for example, includes four navigation keys, i.e. up, down, left, and right arrow keys, an OK key, and an ESC key. In FIG. 3A, the electronic apparatus 300 can be linked to the network by a built-in or an externally connected network connecting module (not shown) to download a web page from the network and display the contents of the web page on the first display unit 310. Herein, the web page includes a vector graphics file 311 and a dynamic GIF graphics file 312. When detecting the vector graphics file 311 and the dynamic GIF graphics file 312, the electronic apparatus 300 covers the positions on the first display unit 310 that originally display the vector graphics file 311 and the dynamic GIF graphics file 312 with a static image 313, and displays a first option 321 and a second option 322 on the second display unit 320. When users select the first option 321 by the pointer selecting unit 330, the vector graphics file 311 corresponding to the first option 321 is immediately displayed on the second display unit 320, as shown in FIG. 3A. Alternatively, when users want to watch the dynamic GIF graphics file 312, the users can select the second option 322 by the pointer selecting unit 330 to display the dynamic GIF graphics file 312 on the second display unit 320, as shown in FIG. 3B.

Figure 4:
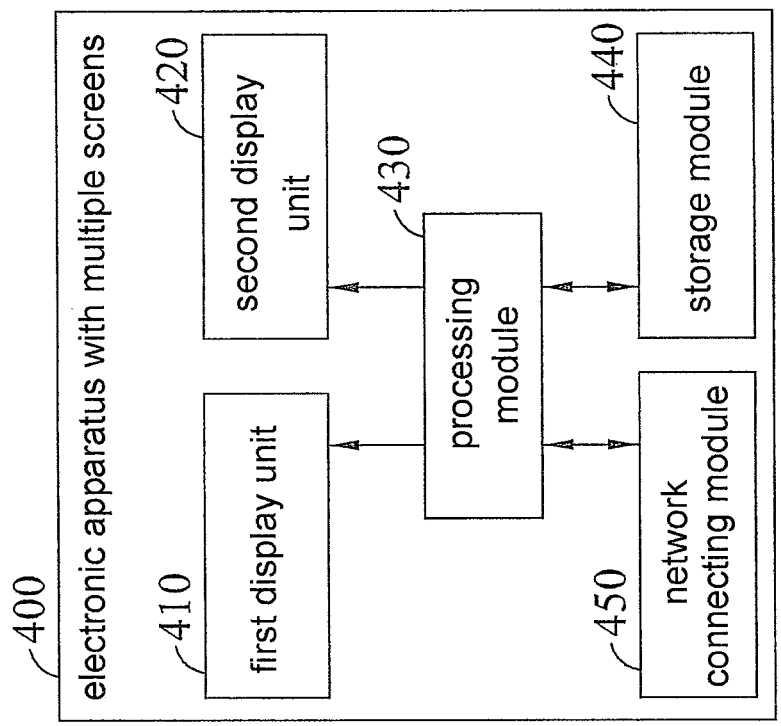
FIG. 4 is a block diagram of an electronic apparatus with multiple screens according to a first embodiment of the invention.

FIG. 4 is a block diagram of an electronic apparatus with multiple screens according to a first embodiment of the invention. Referring to FIG. 4, the electronic apparatus 400 includes a first display unit 410, a second display unit 420, a processing module 430, a storage module 440, and a network connecting module 450. The processing module 430 is electrically connected to the first display unit 410, the second display unit 420, the storage module 440, and the network connecting module 450. When the electronic apparatus 400 is linked to the network by the network connecting module 450 and reads or downloads a web page, the processing module 430 first temporarily stores the contents of the web page in the storage module 440 and then displays the web page contents on the first display unit 410. After the web page has been completely read or downloaded, the processing unit 430 immediately detects and analyzes the contents of the web page. When the contents of the web page includes a dynamic image, the processing unit 430 selectively displays the dynamic image on the second display unit 420 and then extracts a static image from the storage module 440 to cover a position on the first display unit 410 that originally displays the dynamic image.

Figure 5:
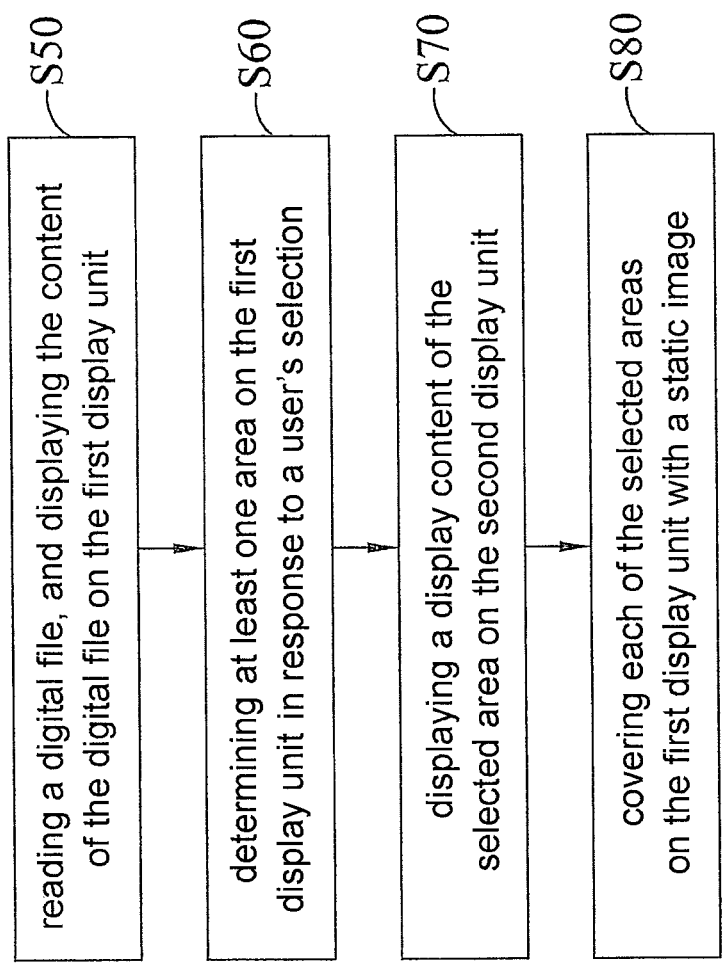
FIG. 5 is a flowchart of an image displaying method according to a second embodiment of the invention.

FIG. 5 is a flowchart of an image displaying method according to a second embodiment of the invention. Referring to FIG. 5, the image displaying method is adapted to an electronic apparatus including a first display unit and a second display unit. The image displaying method includes following steps.

In step S50, by the processing module, a digital file is read, and the content of the digital file is displayed on the first display unit. In the present embodiment, the processing module may be linked to the network by a network connecting module built in or externally connected to the electronic apparatus, so as to read or download the digital file from the network. The digital file, for example, a web page, a document, or other file format readable by the electronic apparatus.

In step S60, at least one area on the first display unit is determined in response to a user's selection by an area selecting module.

In step S70, a display content of the selected area is displayed on the second display unit by the processing module.

In step S80, by the processing unit, a static image is read from a storage module, and each of the selected areas on the first display unit is further covered with the static image.

When more than one area are determined in response to a user's selection by the area selecting module, the processing module displays options corresponding to each of the selected areas on the second display unit. When users select any of the options by clicking a pointer selecting unit, the second display unit thereby displays the contents of the area corresponding to each of the selected options.

Figure 6:
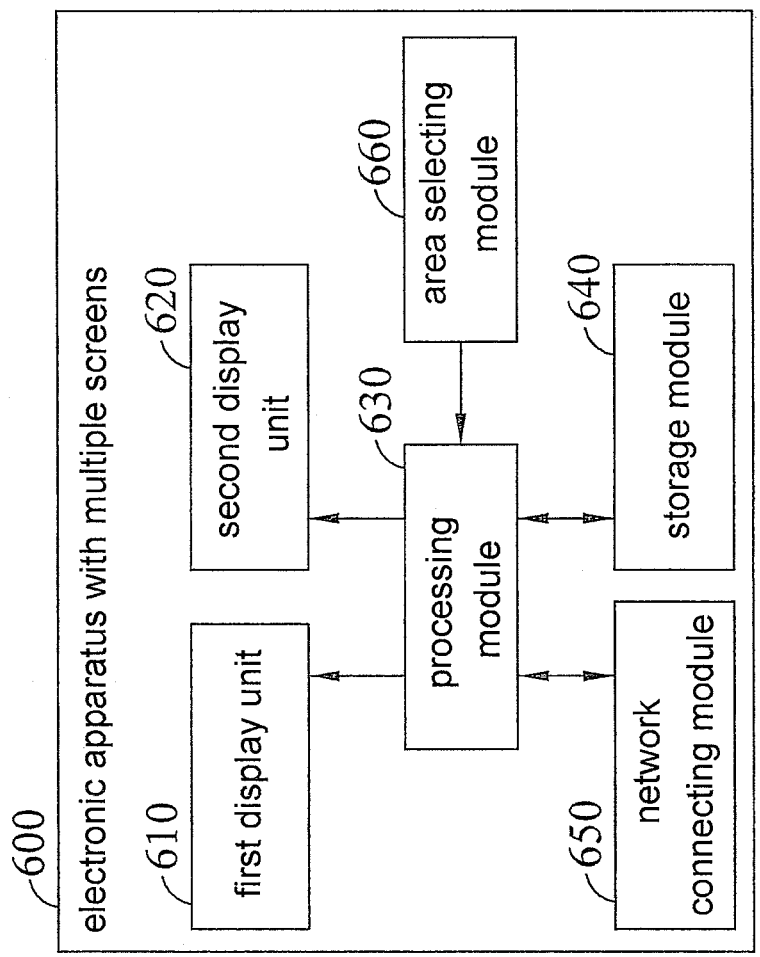
FIG. 6 is a block diagram of an electronic apparatus with multiple screens according to a second embodiment of the invention.

FIG. 6 is a block diagram of an electronic apparatus with multiple screens according to a second embodiment of the invention. Referring to FIG. 6, the electronic apparatus 600 includes a first display unit 610, a second display unit 620, a processing module 630, a storage module 640, a network connecting module 650, and an area selecting module 660. The processing module 630 is electrically connected to the first display unit 610, the second display unit 620, the storage module 640, the network connecting module 650, and the area selecting module 660. The electronic apparatus 600 is linked to the network by the network connecting module 650 to download a web page or opens a file to read data stored in the storage module 640. The processing module 630 then displays contents of the web page or the file on the first display unit 610. The area selecting module 660 allows users to select one or more areas on the first display unit 610, so that contents of the selected area or areas are displayed on the second display unit 620. The area selecting module 660, for example, includes four navigation keys, i.e. up, down, left and right arrow keys, an OK key, and an ESC key. The processing module 630 can further extract one or more static images from the storage module 640 and covers the selected area or areas on the first display unit 610 with the static image or images.

When a plurality of areas are selected, the processing module 630 controls the second display unit 620 to display options corresponding to each of the selected areas. Users can click to select any of the options, so that the second display unit 620 displays the contents of the area corresponding to the selected option.

It will be apparent to those skilled in the art that various modifications and variations can be made to the structure of the present invention without departing from the scope or spirit of the invention. As provided above, it is intended that the specification and examples to be considered as exemplary only, with a true scope and spirit of the invention being indicated by the following claims and their equivalents.

What is claimed is:

1. An image displaying method, adapted to an electronic apparatus, wherein the electronic apparatus comprises a first display unit and a second display unit, the image displaying method comprising:
   reading a digital file and displaying a content of the digital file on the first display unit by a processing module;
   detecting whether the content of the digital file comprises at least one dynamic image by the processing module;
   displaying the at least one dynamic image on the second display unit by the processing module when the content of the digital file comprises the at least one dynamic image;
   covering a display position of the at least one dynamic image on the first display unit with a static image by the processing module; and
   providing a storage module to store the static image.

2. The image displaying method as claimed in claim 1, further comprising:
   respectively displaying options corresponding to each of the dynamic images by the second display unit; and
   providing a pointer selecting unit to click one of the options, such that the processing module displays the dynamic image corresponding to the clicked option on the second display unit.

3. The image displaying method as claimed in claim 1, wherein the first display unit is a display having a low refresh rate, the refresh rate of the first display unit is about smaller than 5 frames per second (FPS), and the second display unit is a display having a high refresh rate, the refresh rate of the second display unit is about between 5 FPS and 10 FPS.

4. The image displaying method as claimed in claim 1, further comprising:
   providing a network connecting module to connect to a predetermined website, such that the processing module reads the digital file from the predetermined website.

5. An electronic apparatus with multiple screens, comprising:
   a first display unit;
   a second display unit; and
   a processing module electrically connected to the first display unit and the second display unit, reading a digital file to display a content of the digital file on the first display unit, and detecting whether the content of the digital file comprises at least one dynamic image,
   wherein the processing module controls the second display unit to display the at least one dynamic image when the content of the digital file comprises the at least one dynamic image, and the processing module covers a display position of the at least one dynamic image on the first display unit with a static image, and the electronic apparatus further comprises a storage module to store the static image.

6. The electronic apparatus as claimed in claim 5, wherein the processing module further controls the second display unit to respectively display options corresponding to each of the dynamic images, and the electronic apparatus further comprises a pointer selecting unit to click one of the options, such that the processing module displays the dynamic image corresponding to the clicked option on the second display unit.

7. The electronic apparatus as claimed in claim 5, wherein the first display unit is a display having a low refresh rate, the refresh rate of the first display unit is about smaller than 5 FPS, and the second display unit is a display having a high refresh rate, the refresh rate of the second display unit is about between 5 FPS and 10 FPS.

8. The electronic apparatus as claimed in claim 5, further comprising a network connecting module to connect to a predetermined website, such that the processing module reads the digital file from the predetermined website.

9. An image displaying method, adapted to an electronic apparatus, wherein the electronic apparatus comprises a first display unit and a second display unit, the image displaying method comprising:
   reading a digital file and displaying a content of the digital file on the first display unit by a processing module;
   determining, in response to a user's selection, at least one area on the first display unit by an area selecting module;
   displaying a display content of the at least one area on the second display unit by the processing module;
   covering a display position of the at least one area on the first display unit with a static image by the processing module; and
   providing a storage module to store the static image.

10. The image displaying method as claimed in claim 9, further comprising
   respectively displaying options corresponding to each of the areas by the second display unit; and
   providing a pointer selecting unit to click one of the options, such that the processing module displays the display content of the area corresponding to the clicked option on the second display unit.

11. The image displaying method as claimed in claim 9, wherein the first display unit is a display having a low refresh rate, the refresh rate of the first display unit is about smaller than 5 FPS, and the second display unit is a display having a high refresh rate, the refresh rate of the second display unit is about between 5 FPS and 10 FPS.

12. The image displaying method as claimed in claim 9, further comprising:
   providing a network connecting module to connect to a predetermined website, such that the processing module reads the digital file from the predetermined website.

13. An electronic apparatus with multiple screens, comprising:
   a first display unit;
   a second display unit;
   a processing module electrically connected to the first display unit and the second display unit, and reading a digital file to display a content of the digital file on the first display unit; and
   an area selecting module electrically connected to the processing module and determining, in response to a user's selection, at least one area on the first display unit, such that the processing module displays a display content of the at least one area on the second display unit,
   wherein the processing module covers a display position of the at least one area on the first display unit with a static image, and the electronic apparatus further comprises a storage module to store the static image.

14. The electronic apparatus as claimed in claim 13, wherein the processing module controls the second display unit to respectively display options corresponding to each of the areas, and the electronic apparatus further comprises a pointer selecting unit to click one of the options, such that the processing module displays the dynamic image corresponding to the clicked option on the second display unit.

15. The electronic apparatus as claimed in claim 13, wherein the first display unit is a display having a low refresh rate, the refresh rate of the first display unit is about smaller than 5 FPS, and the second display unit is a display having a high refresh rate, the refresh rate of the second display unit is about between 5 FPS and 10 FPS.

16. The electronic apparatus as claimed in claim 13, further comprising a network connecting module to connect to a predetermined website, such that the processing module reads the digital file from the predetermined website.

\* \* \* \* \*